United States Patent
Korobov et al.

(10) Patent No.: US 11,706,282 B1
(45) Date of Patent: *Jul. 18, 2023

(54) SYSTEM AND METHOD FOR SHARING ELECTRONIC DATA USING A MOBILE DEVICE

(71) Applicant: PARALLELS INTERNATIONAL GMBH, Schaffhausen (CH)

(72) Inventors: Ivan Korobov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,800

(22) Filed: May 23, 2022

Related U.S. Application Data

(63) Continuation of application No. 15/817,339, filed on Nov. 20, 2017, now Pat. No. 11,343,304.

(51) Int. Cl.
*H04L 67/06* (2022.01)
*H04L 67/141* (2022.01)
*H04L 67/51* (2022.01)

(52) U.S. Cl.
CPC ............ *H04L 67/06* (2013.01); *H04L 67/141* (2013.01); *H04L 67/51* (2022.05)

(58) Field of Classification Search
CPC .... H04L 67/36; H04L 67/1095; G06F 3/1454
See application file for complete search history.

(56) References Cited

U.S. PATENT DOCUMENTS

| | | | |
|---|---|---|---|
| 9,065,872 B1 | 6/2015 | Duarte et al. | |
| 9,112,871 B2 | 8/2015 | Borzsei et al. | |
| 9,400,801 B1 | 7/2016 | Aplemakh et al. | |
| 9,589,255 B1* | 3/2017 | Sandrew | G06Q 10/1093 |
| 9,788,063 B1* | 10/2017 | Bush | H04N 21/4622 |
| 9,990,370 B1 | 6/2018 | Aplemakh et al. | |
| 10,313,284 B1* | 6/2019 | Oostergo | H04L 51/18 |
| 10,536,407 B1* | 1/2020 | Doorn | G06F 3/04842 |
| 11,315,566 B2* | 4/2022 | Weksler | H04L 51/52 |
| 11,343,304 B2* | 5/2022 | Korobov | H04L 67/06 |
| 2004/0257610 A1 | 12/2004 | Itoh et al. | |
| 2006/0009155 A1* | 1/2006 | Paalasmaa | H04W 4/02 455/41.2 |
| 2008/0307067 A1 | 12/2008 | Cisler et al. | |

(Continued)

FOREIGN PATENT DOCUMENTS

EP 3038328 A1 6/2016

*Primary Examiner* — Shean Tokuta
(74) *Attorney, Agent, or Firm* — Rosenberg, Klein & Lee

(57) ABSTRACT

A system and method are provided for sharing electronic data on a personal computing device using a connected mobile electronic device. An exemplary system includes a client module installed on a mobile device that identifies a list Of data sharing services installed on the mobile device, at least one data sharing service configured to share data to a remote device and transmit the list indicating to a computing device. Moreover, an agent module installed on the computing device selects one or more electronic files to be shared by the mobile device and selects the one of the data sharing services for sharing the selected electronic files. The agent module can then transmit the selected electronic files to the mobile device for data sharing using the selected data sharing service.

7 Claims, 8 Drawing Sheets

(56) References Cited

U.S. PATENT DOCUMENTS

| | | |
|---|---|---|
| 2010/0161724 A1 | 6/2010 | Sathyan et al. |
| 2010/0211637 A1 | 8/2010 | Borzsei et al. |
| 2011/0083111 A1 | 4/2011 | Forutanpour et al. |
| 2011/0161445 A1 | 6/2011 | Nekle et al. |
| 2011/0264992 A1 | 10/2011 | Vishria et al. |
| 2012/0226663 A1 | 9/2012 | Kline et al. |
| 2012/0266091 A1* | 10/2012 | Kim .................. H04W 4/21 715/760 |
| 2013/0205219 A1 | 8/2013 | Moha et al. |
| 2013/0283181 A1 | 10/2013 | Mazzaferri |
| 2013/0332856 A1 | 12/2013 | Sanders et al. |
| 2014/0067976 A1 | 3/2014 | Song et al. |
| 2015/0029530 A1* | 1/2015 | Asai .................. H04N 1/00413 358/1.15 |
| 2015/0119002 A1 | 4/2015 | Chen et al. |
| 2015/0163371 A1 | 6/2015 | Asai |
| 2015/0169391 A1 | 6/2015 | Asai |
| 2015/0229655 A1 | 8/2015 | Savant |
| 2015/0331728 A1 | 11/2015 | Kim et al. |
| 2015/0347200 A1 | 12/2015 | Fadel et al. |
| 2015/0378591 A1 | 12/2015 | Yang et al. |
| 2016/0058336 A1 | 3/2016 | Blahnik et al. |
| 2016/0062553 A1 | 3/2016 | Kang |
| 2016/0065661 A1 | 3/2016 | Kang |
| 2016/0066358 A1 | 3/2016 | Kim et al. |
| 2016/0125573 A1 | 5/2016 | Takayama |
| 2016/0150063 A1* | 5/2016 | Choi .................. H04M 1/72403 455/414.1 |
| 2016/0191432 A1* | 6/2016 | Panchapakesan ....... H04L 51/42 709/206 |
| 2016/0191621 A1* | 6/2016 | Oh .................. H04L 67/1095 709/205 |
| 2016/0210662 A1 | 7/2016 | Duggal et al. |
| 2016/0212209 A1 | 7/2016 | Qian |
| 2016/0255268 A1 | 9/2016 | Kang et al. |
| 2016/0360339 A1 | 12/2016 | Yuan et al. |
| 2017/0025151 A1 | 1/2017 | Han et al. |
| 2017/0034264 A1 | 2/2017 | Yang et al. |
| 2017/0039544 A1 | 2/2017 | Park et al. |
| 2017/0286419 A1 | 10/2017 | Tang et al. |
| 2018/0191816 A1 | 7/2018 | Lee et al. |
| 2019/0149677 A1 | 5/2019 | Sone |
| 2019/0158507 A1 | 5/2019 | Belz et al. |
| 2019/0158570 A1* | 5/2019 | Korobov .................. H04L 67/06 |
| 2020/0120453 A1* | 4/2020 | Kim .................. H04W 72/02 |

* cited by examiner

SYSTEM AND METHOD FOR SHARING ELECTRONIC DATA USING A MOBILE DEVICE

CROSS-REFERENCE TO RELATED APPLICATIONS

This patent claims the benefit of priority as a continuation patent application of U.S. patent application Ser. No. 15/817,339 filed Nov. 20, 2017; the entire content of which is incorporated herein by reference.

TECHNICAL FIELD

The current disclosure generally relates to the field of electronic data transfer, and, more particularly, to a system and method for sharing electronic data on a personal computing device using a connected mobile electronic device.

BACKGROUND

Currently, mobile devices and computers provide a wide range of capabilities to share data, information and content via e-mails, instant messengers, Cloud storages, and the like. However, sometimes, especially on legacy operating systems, or when a user works inside a temporary remote session, content sharing might be cumbersome, since the legacy operating systems lack integrated content sharing capabilities, the Cloud applications require specific account configuration and Internet connectivity, and the like.

At the same time, most computer users today have mobile devices that have extensive capabilities for data, content and information sharing for broad range of services. Moreover, these mobile devices are almost always connected for wireless data communications and ready for data sharing. Accordingly, a methodology is needed for being able to utilize the sophisticated and user-friendly capabilities of a mobile device with computing systems having legacy operating systems.

SUMMARY

Accordingly, a system and method are provided for using mobile devices as universal mediators, which make it easier for users to share data, information and content residing on a local or a remote host in cases where direct data sharing for the host/remote session is limited or impossible. Advantageously, the disclosed system and method streamlines a user's experience to share data from a computer or a remote session, where data sharing capabilities are limited or do not exist, over a wide range of data sharing services available on a mobile device.

According to an exemplary aspect, a method is provided for sharing data stored on a computing device by a mobile device. In this aspect, the method includes identifying, by a client module installed on a mobile device, at least one data sharing service installed on the mobile device, the at least one data sharing service configured to share data to a remote device; transmitting, by the client module, a list indicating the at identified at least one data sharing service to an agent module installed on a host computing device, selecting, by the agent module installed on the host computing device, at least one electronic file to be shared by the mobile device; selecting, by the agent module installed on the host computing device, the at least one data sharing service for sharing the selected at least one electronic file; and transmitting, by the agent module installed on the host computing device, the selected at least one electronic file to the mobile device for data sharing using the selected at least one data sharing service.

In another exemplary aspect, the method includes transmitting, by the agent module installed on the host computing device, an intent to share the selected at least one electronic file; and transmitting, by the agent module installed on the host computing device, the selected at least one electronic file upon receiving confirmation by the client module to receive and share the file in response to the transmitted intent.

In another exemplary aspect, the method includes launching, by the client module installed on the mobile device, an interactive remote session on the mobile device to access the host computing device by the client module installed on the mobile device.

In another exemplary aspect, the method includes selecting the at least one electronic file to be shared by the mobile device and the at least one data sharing service for sharing the selected at least one electronic file by the client module using the interactive remote session to control the agent module to perform the selecting.

In another exemplary aspect, the method includes registering, by the agent module, with the host operating system of the host computing device as a shell or share extension.

In another exemplary aspect, the method includes sharing, by the client module installed on the mobile device, the selected at least one electronic file to the remote device using the selected at least one data sharing service.

In another exemplary aspect, the method includes authenticating the client module installed on the mobile device with the agent module installed on the host computing device before transmitting, by the agent module installed on the host computing device, the selected at least one electronic file to the mobile device.

In another exemplary aspect of the method, the host computing device does not include at least one of software and hardware required to share selected at least one electronic file using the selected at least one data sharing service.

In an exemplary aspect, a system is provided for sharing data stored on a computing device by a mobile device. In this aspect, the system includes a client module installed on a mobile device and configured to identify at least one data sharing service installed on the mobile device, the at least one data sharing service configured to share data to a remote device, and transmit a list indicating the at identified at least one data sharing service to the host computing device; and an agent module installed on the host computing device and configured to select at least one electronic file to be shared by the mobile device, select the at least one data sharing service for sharing the selected at least one electronic file, and transmit the selected at least one electronic file to the mobile device for data sharing using the selected at least one data sharing service.

According to another exemplary aspect, a non-transitory computer readable medium storing computer executable instructions is provided for sharing data stored on a computing device by a mobile device. In this aspect, instructions are provided for identifying, by a client module installed on a mobile device, at least one data sharing service installed on the mobile device, the at least one data sharing service configured to share data to a remote device; transmitting, by the client module, a list indicating the at identified at least one data sharing service to an agent module installed on a host computing device; selecting, by the agent module installed on the host computing device, at least one electronic file to be shared by the mobile device; selecting, by the agent module installed on the host computing device, the at least one data sharing service for sharing the selected at least one electronic file; and transmitting, by the agent module installed on the host computing device, the selected at least one electronic file to the mobile device for data sharing using the selected at least one data sharing service.

The above simplified summary of example aspects serves to provide a basic understanding of the present disclosure. This summary is not an extensive overview of all contemplated aspects, and is intended to neither identify key or critical elements of all aspects nor delineate the scope Of any or all aspects Of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects Of the present disclosure and, together with the detailed description, serve to explain their principles and implementations.

DETAILED DESCRIPTION

Figure 1:
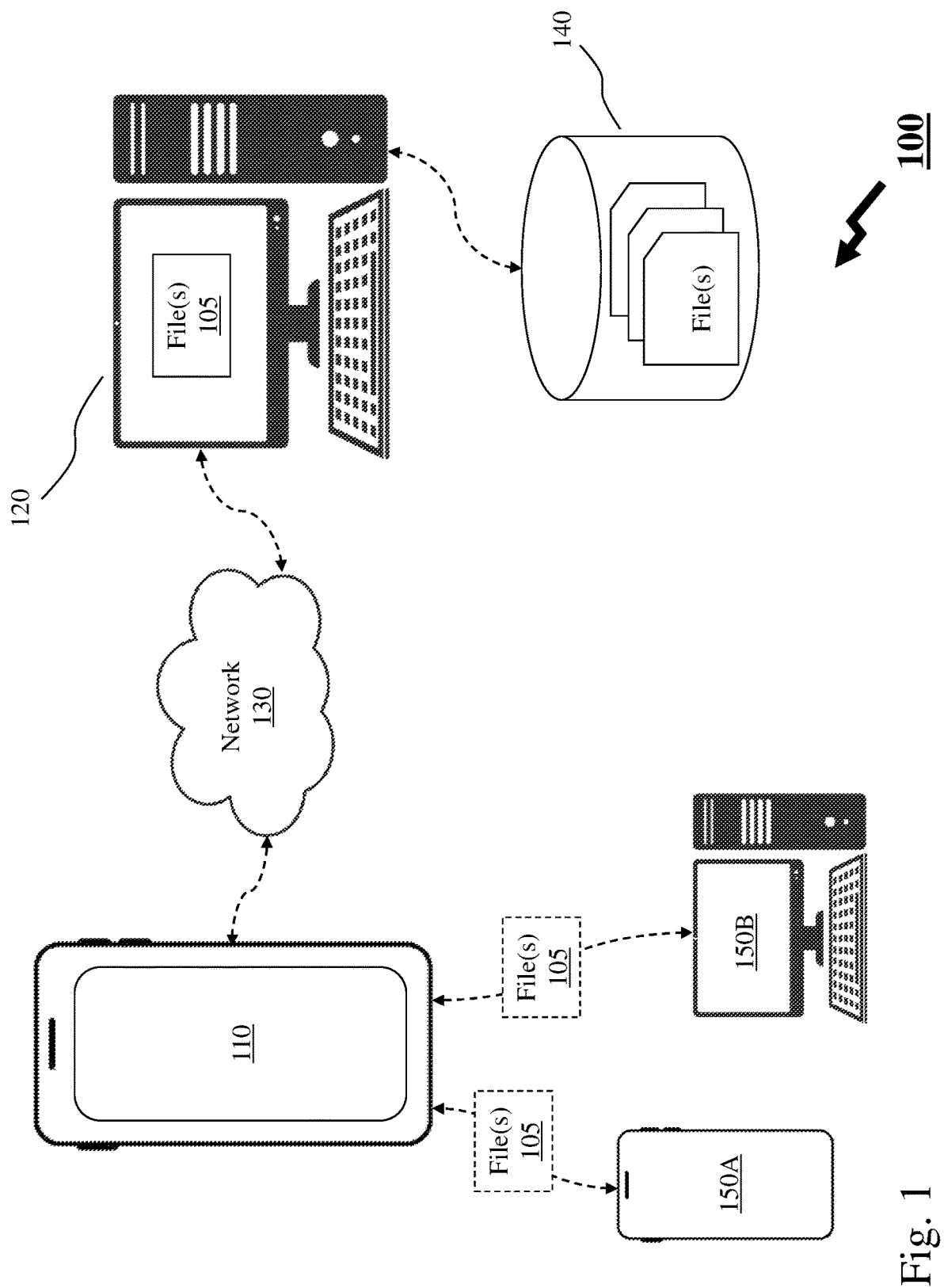
FIG. 1 illustrates a block diagram of a system for sharing electronic data from a computer using a mobile device according to an exemplary aspect.

FIG. 1 illustrates a block diagram of a system 100 for sharing electronic data from a computer using a mobile device according to an exemplary aspect. As shown, the system 100 generally includes one or more mobile client devices 110, one or more personal computers 120, and a network 130 that facilitates data communication between the client device(s) 110 and the personal computer(s) 120. For purposes of the following disclosure, the system and method is described as implementing a single mobile client device 110 and a single personal computer 120, although it should be appreciated that multiple client devices and personal computers can be implemented in an exemplary aspect.

According to the exemplary aspect, the system 100 enables the client device 110 to communicate with personal computer 120 and access one or more electronic files 105 that it can then share (i.e., transfer to) another computing device, such as a remote mobile device 150A or remote personal computer/server 150B, for example. Preferably, the client device 110 is a mobile device, such as a smartphone, tablet, laptop or the like that is configured to communicate wirelessly and remotely with Other computing devices, using know electronic data communication techniques and protocols. Moreover, personal computer 120 can be a desktop computer, laptop or similar device according to an exemplary aspect. For example, both the mobile client device 110 and the personal computer 120 can be owned/operated by the same user with the personal computer 120 being located in the user's residence, office or the like. In an alternative aspect, the personal computer 120 can instead be a server in communication with one or more databases (e.g., database 140), as will be discussed in more detail below, which can also host files for sharing according to the exemplary aspect In general, the personal computer 120 or server that is storing the one or electronic data files to be transferred can be considered a "host" device or "host" computing device. Furthermore, the electronic data 105 to be transferred can be any type of data, electronic file, etc., to be transferred, such as, for example, an image (e.g., jpeg or .gif image), an electronic text message, an electronic file (e.g. a Word document or Excel file), a URL link, or the like, and should in no way be limited_ For purposes of the examples described herein, the electronic data to be transferred is generally described as electronic files 105.

Moreover, as will be explained in more detail below, the system 100 enables the mobile client device 110 to operate in two separate modes depending on its physical position relative to the personal computer 120 in order to accommodate the user's ability to perform the electronic file sharing. For example, in a first operational mode, when the user is positioned close in proximity to the personal computer 120 (e.g., in the same room of the user's residence), the network 130 can be provided as for wireless communication between the two devices, using Bluetooth, WiFi direct, or similar wireless communication protocols (for devices in close proximity) and techniques as should be appreciated to one skilled in the art.

Moreover, in a second operational mode, if the mobile client device 110 is not in the same vicinity as the personal computer 120 (i.e., in physical position where the user can operate both devices at the same time), the mobile client device 110 is configured to operate in an interactive remote session as will be described in detail below. In this aspect, the mobile client device 110 is configured to remotely communicate with the personal computer 120 over a network 130, which can also implement remote data communication techniques.

Thus, in general, it should be appreciated that the network 130 can be any type of applicable network for communicating data and data operations and can include a communication system (not shown) that connects the various components of the system 100 by wire, cable, fiber optic, and/or wireless links facilitated by various types of well-known network elements, such as hubs, switches, routers, and the like, It should be appreciated that the network may employ various well-known protocols to communicate information amongst the network resources. In one aspect, the network can be part of the Internet as would be understood to one skilled in the art. Thus, using the network 130, the mobile client device 110 and personal computer 120 can communicate with each other using the appropriate data communication protocols according to the first or second operational mode, as should be appreciated to one skilled in the art. Moreover, it is noted that the specific interfaces and device components of the mobile client device 110 and the personal computer 120 for performing the data communications described herein have not been shown as the devices can implement conventional communication interfaces that are well known to those skilled in the art.

Figure 2:
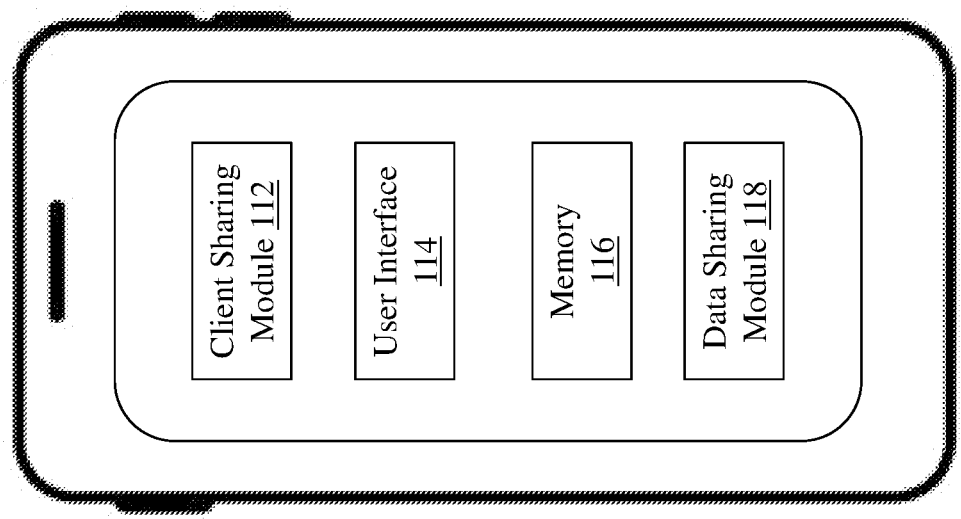
FIG. 2 illustrates a block diagram of a mobile device implemented in the system shown in FIG. 1 according to an exemplary aspect

FIG. 2 illustrates a block diagram of a mobile device implemented in the system shown in FIG. 1 according to an exemplary aspect. As shown, the mobile client device 110 includes mobile "client" component, which can be, for example, a remote desktop application, such as Parallels Access or Parallels Remote Application Server Clients, or alternatively can be a stand-alone utility application. In general, the mobile client component is shown as mobile client communication module 112 and also generally referred to as the "client component".

Figure 3:
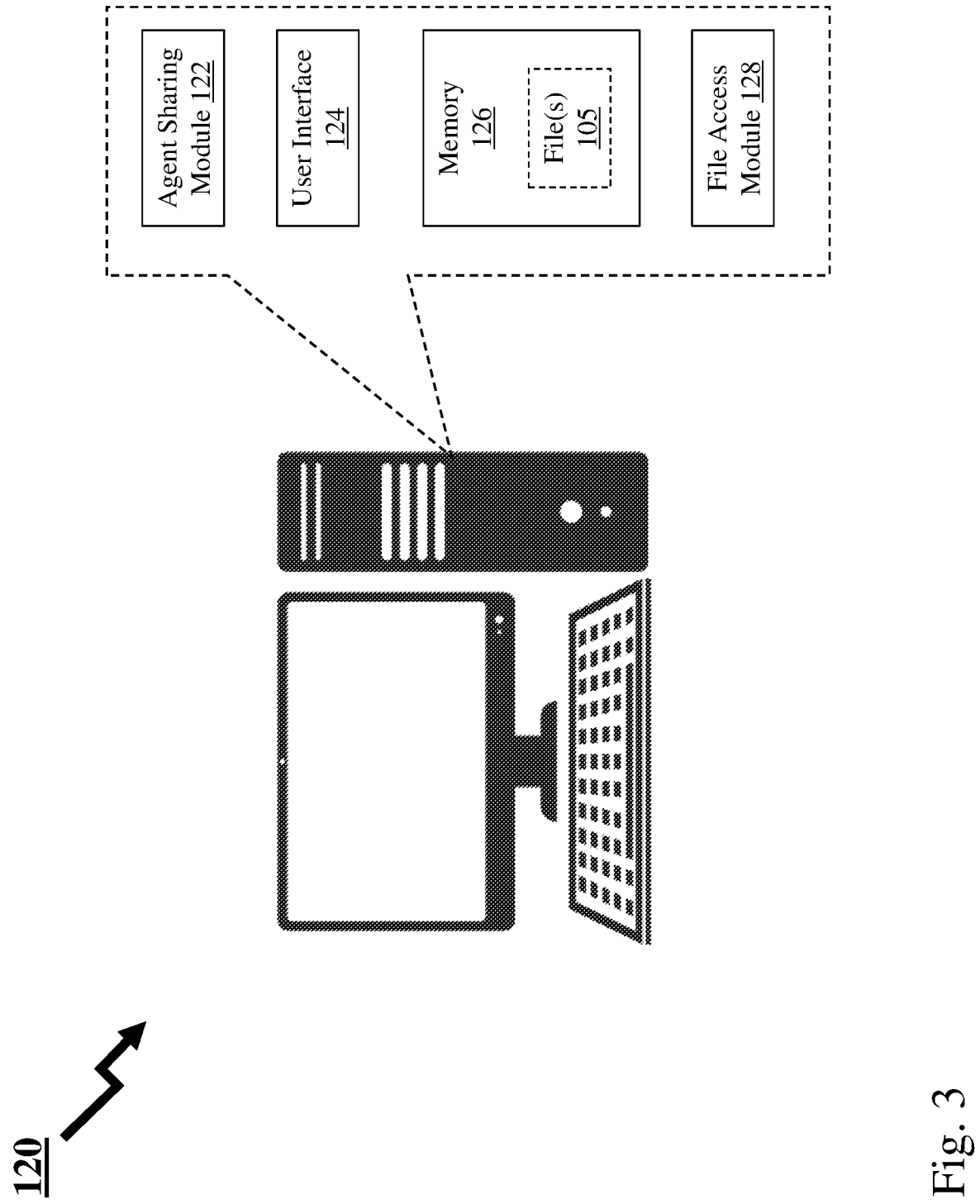
FIG. 3 illustrates a block diagram of a personal computer implemented in the system shown in FIG. 1 according to an exemplary aspect.

FIG. 3 illustrates a block diagram of a personal computer implemented in the system shown in FIG. 1 according to an exemplary aspect According to the exemplary aspect, to facilitate communication between the mobile client device 110 and the personal computer 120, an "agent" component can be installed on the personal computer 120, which is shown as agent communication module 122. In an exemplary aspect, the agent communication module 122 can be integrated into a Parallels Access agent or a Parallels RAS agent installed on the personal computer 120, or alternatively can be installed as a stand-alone service application. In general, Parallels Access (PAX) is a software that provides the ability to remotely access the personal computer 120 from any portable device (e.g., mobile client device 110) and remotely work with the computer using the portable device. Moreover, Parallels RAS provides the ability to work with applications that are executed on a server with the help of any computing device. Thus, the PAX/RAS application installed on the host device (whether a personal computer or server) enables the mobile client device the communicate with the host device an access one or more electronic files (105) according to the exemplary algorithms as described below.

In general, as used herein, the term "module" refers to a software service or application executed on one or more computers, including real-world devices, components, or arrangement of components implemented using a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations and should not be limited to any example implementation exemplified herein.

When the agent communication module 122 (i.e., the "Agent" component) is installed on the personal computer 120, it registers itself as a share extension (e.g., if the computer 120 is running macOS) or a shell extension for Windows Explorer (e.g., if the computer 120 is running a Windows operating system), so that the host operating system will recognize that the agent communication module 122 is capable of performing certain actions on the electronic files 105 (to be transferred, for example). As further shown, a user interface 124 is provided on the personal computer 120 and that enables the user to begin the agent communication module 122. For example, during operation, if the user wishes to transfer one or more electronic files in (computer memory 126, for example), the a user can select the file(s) 105 through the user interface 124 (e.g., by right-clicking on file(s)), where the user interface 124 can be macOS Finder, Windows Explorer, or the like. Upon selecting the desired file(s) 105 by right clicking, for example, one or more corresponding menu items (which can be provided by the extension noted above, e.g., a share extension or shell extension), can be added to the standard context menu. In other words, since the agent has registered with the operating system of the host device, it can populate a context menu with a list of the available mobile sharing services received from the client as will be discussed in more detail below. Thus, when the user selects this menu item, the agent communication module 122 can be invoked by the host operating system of the personal computer 120 and the information on which the selected one or more files (to be shared) that have been selected by a user can be passed to the agent communication module 122.

As described above, the exemplary system 100 provides two different operational modes depending on the proximity of the mobile client device 110 relative to the personal computer 120. If the mobile device 110 is remotely located from the personal computer 120 (i.e., if the user of the two devices cannot physically operate both devices at the same time), then the mobile client device 110 can launch an interactive remote session to access files on the personal computer 120 (e.g., electronic files stored in memory 126). More particularly, in this instance, the mobile client device 110 can launch (in response to a user input, for example) the mobile client communication module 112, which can operate as the "client" component that is part of PAX/RAS mobile clients so that the mobile client device 110 can have access to files 105 through the interactive remote session. It should be appreciated that both the "client" component (i.e., mobile client communication module 112) and the "agent" component (i.e., agent communication module 122) are authorized and connected to each other already (i.e., PAX/RAS agents are necessary for the interactive remote session to be established) over network 130, for example. Upon connection, the mobile client communication module 112 and the agent communication module 122 are configured to use a custom protocol, for example, to transfer data sharing intent and related payload from the file host 120 (or remote session) to the mobile client device 110.

Furthermore, during the interactive remote session, the mobile client communication module 112 is configured to query the operating system of the mobile device 110 to identify some or all of any data sharing services that are installed on the mobile device 110. For example, on iOS, the mobile client communication module 112 can call the UI Application's can Open URL method for a set of URL schemas that are known to be handled by certain sharing or data exchange services. Moreover, on an Android operating system, the mobile client communication module 112 can query the Android Package Manager for Activities to handle well-known set of Intents for data sharing or exchange, It should be appreciated that these sharing services are merely examples of the available data sharing services for transferring files and that other file and data sharing services and applications can be utilized according to exemplary aspects, as would be appreciated to one skilled in the art.

Once the mobile client communication module 112 and the agent communication module 122 are connected, the mobile client communication module 112 is further configured to transfer the list of available sharing applications/services on the mobile device 110 to the agent communication module 122. In one exemplary aspect, the agent communication module 122 is further configured to receive this list and generate a corresponding list of "mobile" sharing services that can be presented to the user on the user interface 124, for example, as shown in Microsoft Finder, Windows Explorer, or the like. In this aspect, the user can optionally be presented with the list of data sharing services and is provided with the ability to select the desired or necessary sharing service in the menu for the specific transfer of the one or more files. In an alternative aspect, a list of sharing services can be shown on the user interface 114 of the mobile client device 110 when the payload to be shared (i.e., the one or more selected files) is transferred to the mobile device, In this aspect, the user can again select a desired or necessary file sharing service/application via the user interface 114 of the mobile client device 110. It yet a further exemplary, either the mobile client communication module 112 and/or the agent communication module 122 may be configured to automatically select the data sharing service/application for transferring the selected one or more files. That is, either of the modules 112 or 122 can be configured to identify relevant metadata associated with the selected electronic file or data to be transferred (e.g., confidentiality level or the like) and automatically select data sharing service/application that matches the identified metadata. For example, if the selected file is highly confidential or private, the module 112 or 122 may select a data sharing service application that provides a necessary level of security, encryption or the like.

In any event, after (or concurrently) selected the data sharing service by the user, for example, the agent communication module 122 accesses the one or more files or data to be transferred (e.g., from memory 126) and transmits the selected file/data to the client mobile device 110 and particularly to the mobile client communication module 112 over network 130. When the mobile client communication module 112 receives the sharing payload (i.e., the selected file or data) from the agent communication module 122, the mobile client communication module 112 temporarily stores the received payload in memory 116 (which can be any type of applicable electronic memory, such as RAM) on the mobile client device 110.

Then, using standard application programming interfaces APIs) that are provided by the mobile framework, a data sharing module 118 is configured to interface with the installed data sharing services on the mobile client device 110. Depending on the device configuration and type of data to be shared (e.g., text, image, URL link, or the like), the data sharing module 118 can provide on the user interface 114 a standard sharing UI (e.g., as if a user tapped the share button on the mobile device 110), where the user can select the mobile application/service to be used for further data sharing as described above, or the data sharing module 118 can invoke the desired sharing application/service directly, by means of standard URL scheme mechanism, or via an application specific API (i.e., if the third-party sharing application provides the API). It is noted that the data sharing module 118 can be a stand-alone component or can be a sub-module of the client sharing module 112 (i.e., the "client") as described herein.

One the sharing application/service is selected, the data sharing module 118 is configured to initiate the actual transfer the payload temporarily stored in memory 116. As shown, the mobile client device 110 can be communicatively coupled to a plurality Of devices, such as, mobile device 150A, remote server/computer 150B and the like. The type and number of devices is not particularly limited as should be appreciated to one skilled in the art. Using the selected sharing application/service, the data sharing module 118 can then transfer the stored payload to one or more Of these computing devices (i.e., one Of mobile device 150A and/or remote server 150B, for example) as selected by the user.

As further described above, in an alternative aspect, the mobile client communication module 112 and the agent communication module 122 are configured to be used as part of a stand-alone data sharing application (i.e., not as part of either a PAX module or a RAS module). In this aspect, the mobile client device 110 and the personal computer 120 should in the vicinity of each other (i.e., together in the user's residence or office, for example) since the user of the devices needs to be able to operate both devices to share data, such as electronic files as described above. In this case, the mobile device 110 and personal computer 120 are configured to connect and communicate with each other over a wireless communication technology, such as Bluetooth LE, Wi-Fi direct, or the like. Moreover, upon connection, the two device can further be configured to authenticate with each Other either using standard operating system mechanisms, for example, if available (e.g., via iCloud account) or via a custom authentication mechanism (e.g., by exchanging passcodes, using QR codes, or some external authentication service as would be appreciated to one skilled in the art).

In this configuration, to transfer data sharing intent and related payload, the two devices 110 and 120 can employ either standard operating system capabilities, such as Apple's Handoff, or, if Handoff is not available, for example, if data sharing is performed between non-Apple devices, the mobile client communication module 112 and the agent communication module 122 can transfer sharing intent and payload via custom protocols. In any event, using both user interface 114 of mobile client device 110 and user interface 124 of personal computer 120, the user can physically interact with each device to perform a similar methodology as described above for the interactive remote session. Thus, in this aspect, the user can select one or more files 105 to be transferred from memory 128, for example, and also select the particular data sharing service/application for the data sharing. Upon these selections, the agent communication module 122 can access and transfer the selected file(s) to the mobile client device 110 where it is temporarily stored in memory 116 before ultimately being shared with other computing devices (e.g., mobile device 150A and/or remote server 150B) as further described above.

Figure 4:
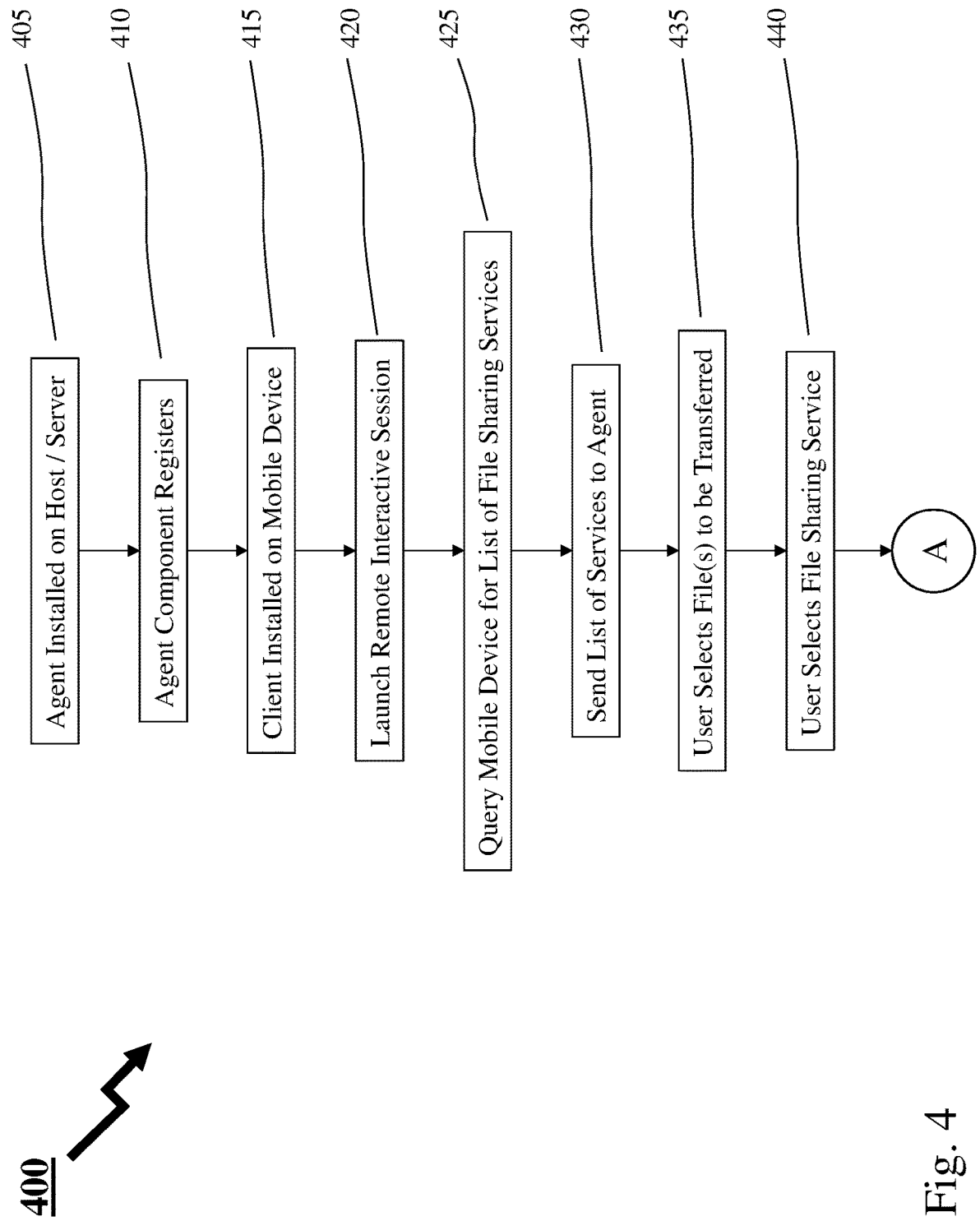
FIG. 4 illustrates a flowchart for a method for sharing electronic data from a computer using a mobile device according to an exemplary aspect.

FIG. 4 illustrates a flowchart for a method for sharing electronic data from a computer using a mobile device according to an exemplary aspect. It should be appreciated that the exemplary method described as follows makes reference to the exemplary system components described above. Moreover, reference to the mobile client communication module 112 is generally referred to as the "client" and reference to the agent communication module 122 is generally referred to as the "agent".

Figure 5:
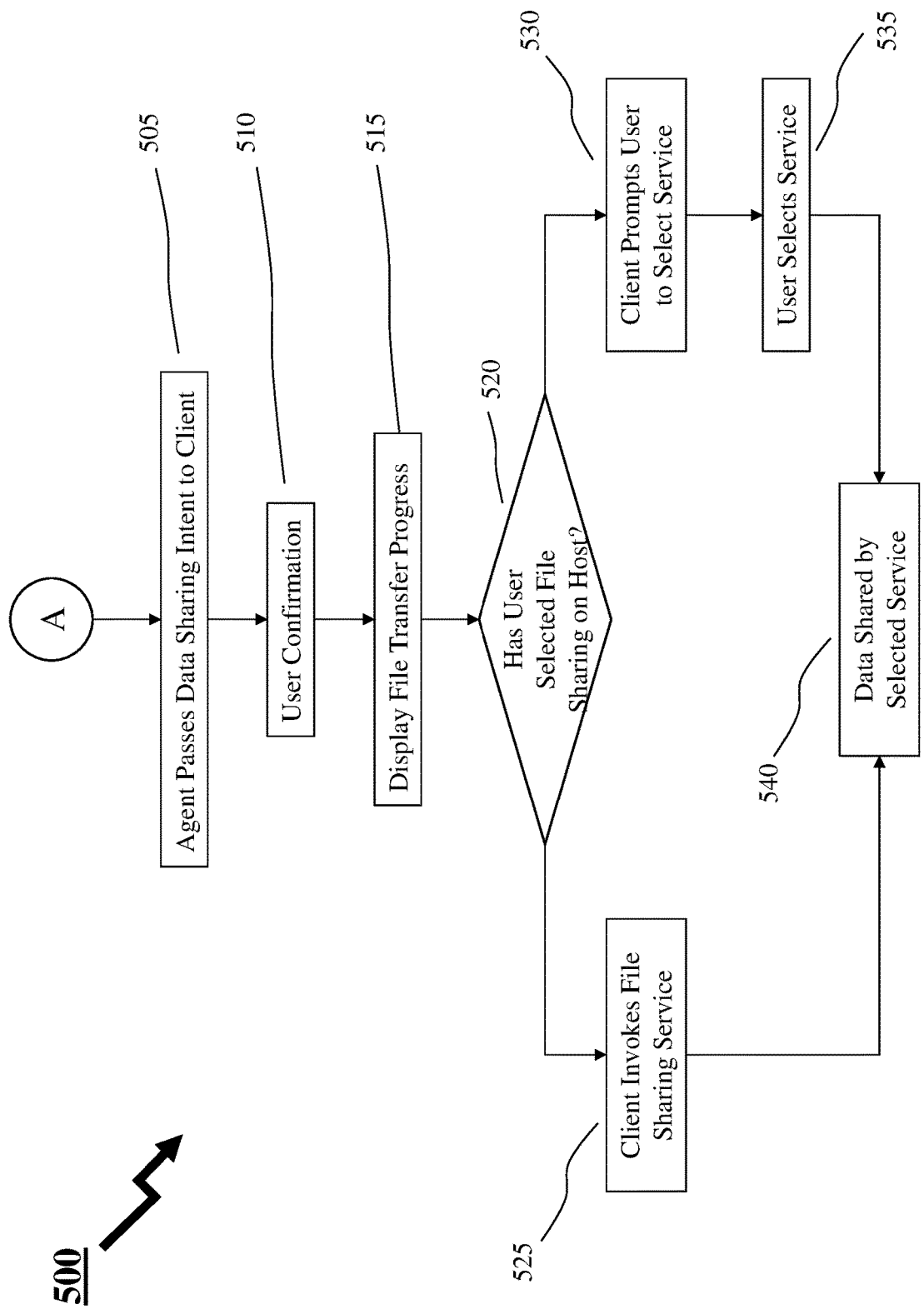
FIG. 5 illustrates a flowchart for a method for sharing electronic data from a computer using a mobile device according to an exemplary aspect.

The methods shown in FIGS. 4 and 5 provide an exemplary aspect for using the remote interactive session by the client as described above. In particular, initially at step 405, the user installs the agent component on the host computer (e.g., as part of PAX) or on the server computer (e.g., as part of RAS). Next, at Step 410, the installed agent registers with the operating system of the host (i.e., either the host computer or server). For example, as described above, the agent can register as a share extension (using macOS) or a shell extension (using Windows), so that the host operating system will recognize that the agent is capable of performing certain actions on the electronic files 105 (to be transferred, for example)

Once the agent is installed by the user on the host system (e.g., personal computer 120), the user no longer needs to be in proximity to the host as the user will be able to perform the file sharing on file(s) 105 using the remote interactive session. In particular, as further shown, the use next installs the client on mobile device 110 at step 415 and then launches the client application to initiate the file sharing. At step 420, the client launches the remote interactive session (e.g., in response to a user prompt on user interface 114 to "Initiate File Sharing?", in which the remote interactive session is connected to the host through the use of the agent described above.

At step 425, the client then queries the operating system of the mobile device 110 for a list of available data sharing services/applications installed on the mobile device 110. The client then sends this list of available sharing services to the agent installed on the host at step 430. Then, at Step 435, the user can access by the remote interactive session the list of available electronic files 105 stored in memory of the host (e.g., personal computer 120) or otherwise accessible by the host (e.g., files on database 140 if the host is a server, for example). This access can be provided by a searching software application, such as Finder or Windows Explorer, where the user can then select (e.g., by right clicking) one or more file(s) 105 to be shared from the host device. The user can then also select a file sharing service/application at step 440 for the selected file(s).

As further shown, the method proceeds to Step "A", which continues in FIG. 5, which also illustrates a flowchart for a method for sharing electronic data from a computer using a mobile device according to an exemplary aspect. At step 505, the agent on the host passes a "data sharing intent" to the client on the mobile device 110. The data sharing intent can be a request back to the mobile device 110 that indicates the selected file(s) 105 and selected data sharing service to be used. The client can then automatically prompt on the user interface 114 of the mobile client device 110 to receive user confirmation to share the file at Step 510. Upon receiving confirmation from the user, a display on the user interface 114 Of an the progress Of the file transfer can be provided as an optional step 515. As noted above, the selected files 105 are temporarily stored in memory 116 of the client mobile device 110.

Once the file transfer to the mobile device is complete, at step 520, the client on the mobile client device 110 confirms whether the user has selected a specific file sharing service/application on the host already. If so, the method proceeds to step 525 where the client invokes the selected service via a URL schema or API (if available) as discussed above. Then, at step 540, the invoked data sharing service (which can be invoked by data sharing module 118, as described above) can transfer the received data file to one or more remotely connected devices (such as mobile device 150A and/or computer 150B), which can also be selected by the user by user interface 114. In one aspect, upon receiving confirmation that the remotely connected computers have correctly received the shared file(s) 105, the mobile client device 110 can delete the file(s) 105 that have been temporarily stored in the memory 116.

As further shown in FIG. 5, if the client determines at step 520 that the user has not selected a particular data sharing service on the host computing system, the client component with invoke a standard mobile operating system prompt on the user interface at step 520 requesting the user to select the desired data sharing service for the selected file(s) 105. Upon receiving the user's selection at step 535, the method proceeds to step 540 and performs the data sharing as described above using the selected data sharing service/application.

Moreover, as described above, the exemplary system and method provide data sharing in two different operational modes, which can be based on the proximity of the mobile client device 110 to the personal computer, i.e., the hosting computer of the electronic files 105 to be transferred. Thus, if the user will not be in proximity to operate both devices at the same time, the user can use the capabilities provided by the remote interactive session described above with respect to FIGS. 5 and 6. In an alternative aspect, the user can operate in a close proximity operational mode in which the user can physically operate both devices at the same.

Figure 6A:
FIG. 6A and 6B illustrates a flowchart for a method for sharing electronic data from a computer using a mobile device according to an exemplary aspect
Figure 6B:
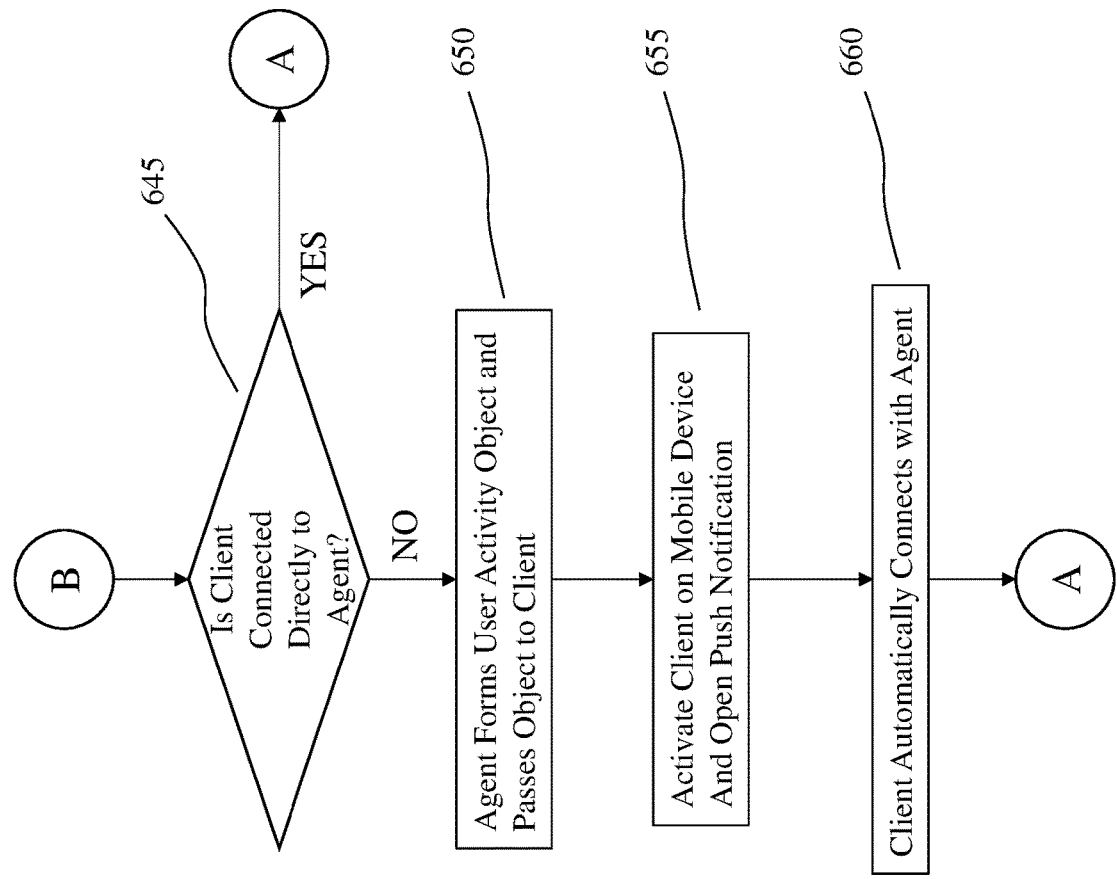

In particular, FIGS. 6A and 6B illustrates a flowchart for a method for sharing electronic data from a computer using a mobile device according to an exemplary aspect in which the client is operating without the interactive remote session. It should be appreciated that the two different operational modes can be selected by the user or that one of the operational modes is automatically selected as a default mode. For example, in one aspect, the exemplary system will default to the close proximity mode unless the user launches the interactive remote session using the client component installed on the mobile client device 110.

According to the close proximity mode, as shown initially at step 605, the agent is installed on the host computing device or server and registers with the host operating system at step 610 in the same manner as described above. Moreover, the user then installs the client on the client mobile device 110 at step 615. It should be appreciated that the order of installing the agent and client components is arbitrary and can be performed in any order. Next, at step 620, the client on the mobile device 110 and the agent on the hosting computer (e.g., personal computer 120) are authorized and paired with each other. As a result, all further communication between the two components/modules can be automatically encrypted (using conventional fata encryption techniques, for example) and the client and agent will automatically discover each other when they are in acceptable proximity, using wireless data communication techniques described above, such as Bluetooth, Wi-Fi direct, or similar data communication protocols, Next, in a similar methodology as described above, the user can then select the files to be shared and desired file sharing service to be used for the file transfer. That is, at step 625, the client then queries the operating system of the mobile device 110 for a list of available data sharing services/applications installed on the mobile device 110. The client then sends this list of available sharing services to the agent installed on the host at Step 630, Then, at Step 635, the user can directly access by the user interface 124 of the host device (e.g., personal computer 120) the list of available electronic files 105 stored in memory of the host (e.g., personal computer 120) or otherwise accessible by the host (e.g., files on database 140 if the host is a server, for example). This access can be provided by a searching software application, such as Finder or Windows Explorer, where the user can then select (e.g., by right clicking) one or more file(s) 105 to be shared from the host device. The user can then also select a file sharing service/application at Step 640 for the selected file(s) using the user interface 124.

The method proceeds to step "B", which continues in FIG. 6B That is, upon the user selected by the agent the files and file sharing service/application to be used, the agent on the host device confirms at step 645 whether the client of the mobile device 110 is directly connected to the agent at that time. If yes, the method proceeds to Step "A" and completes the file sharing method using the algorithm shown in FIG. 5 and described above. Otherwise, if the client and agent are not directly connected as determined at step 645, the method proceeds to step 650 where the agent forms a UserActivity object at step 650 that describes the sharing intent that is passed to the client using a native technology, such as Apple Handoff, a push notification or the like. If a native technology is not available, the agent may use at protocol in an exemplary aspect. Upon receiving this request, a message is prompted on the user interface 114 of the mobile device 110 requesting a confirmation to continue on the mobile client device 110.

At step 655, upon receiving this request, the user can activate the client on the client mobile device 110 by selecting the push notification, for example, or opening it manually. Upon confirmation, the client and the agent again connect to each other automatically and can again begin performing encrypted communication. Then, the method again proceeds to Step "A" and completes the file sharing method using the algorithm shown in FIG. 5 and described above.

It should be appreciated that the two operational modes described above streamline the user's experience to share data from a computer or a remote session, where the data sharing capabilities are limited or do not exist on the host device, using a wide range of data sharing services available on a mobile device. Advantages, the client and agent components enable efficient and fast data sharing of one or more electronic files stored on the host device. Without the exemplary methodology, a user would have first to find out how to transfer data from the computer/remote session (i.e., the host device) to the mobile device manually (e.g., by emailing the file and then how to access this data on a mobile device, which could be cumbersome especially on iOS, for example), before sharing or otherwise passing the data to the data sharing application.

Figure 7:
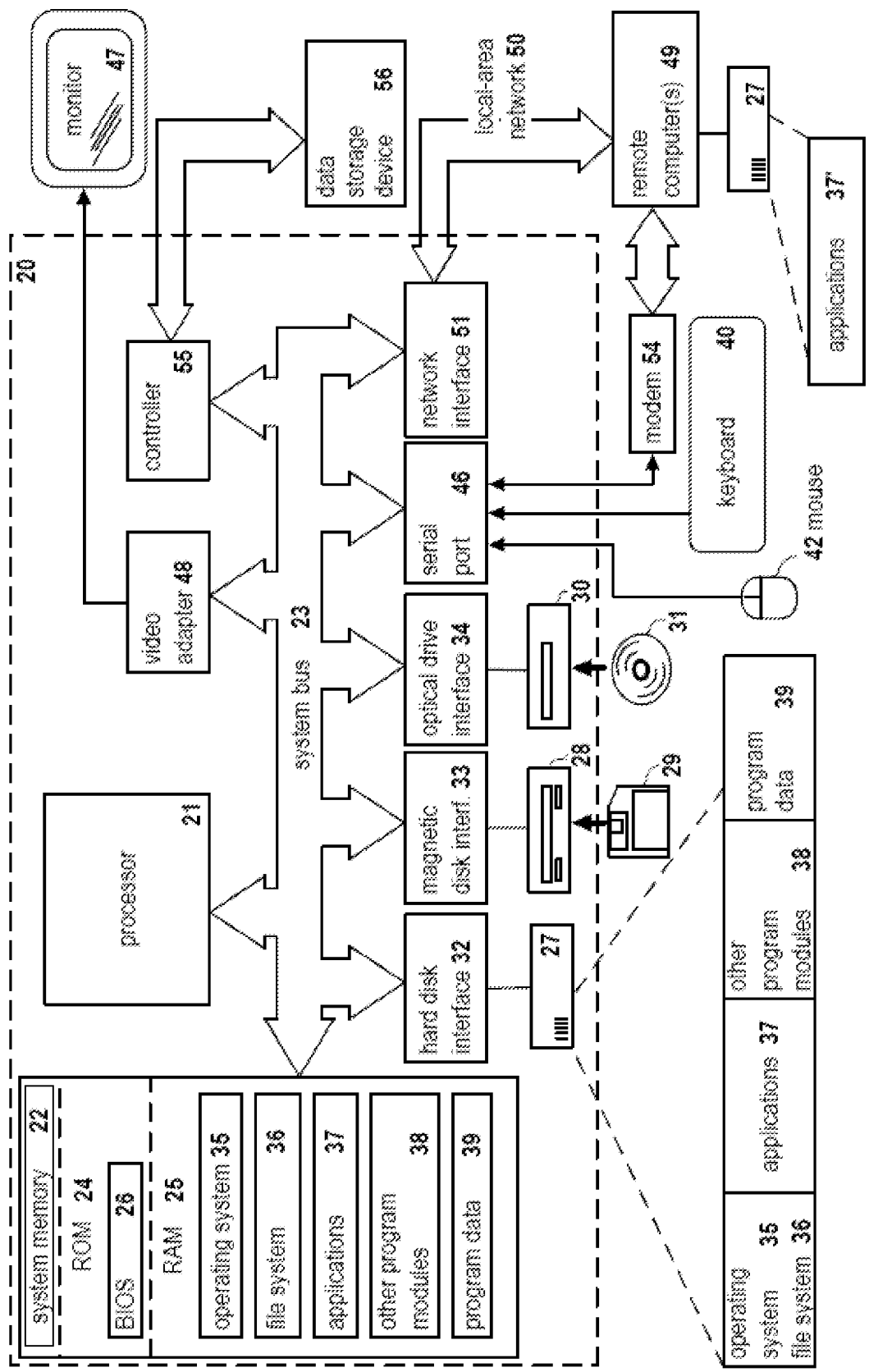
FIG. 7 illustrates a block diagram of an example of a general-purpose computer system (which can be a personal computer or server) on which the disclosed system and method can be implemented according to an example aspect.

FIG. 7 illustrates a block diagram Of an example Of a general-purpose computer system on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to one or more mobile client device 110 and/or the host computing device 120 described above.

In the exemplary aspect, the system bus 23 may be any of several types of bus structures including a memory bus or memory controller, a peripheral bus, and a local bus using any of a variety of bus architectures. The system memory includes read-only memory (ROM) 24 and random access memory (RAM) 25, A basic input/output system 26 (BIOS), containing the basic routines that help transfer information between elements within the computer 104, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 (which can correspond to display 260) and pointing device 42. Other input devices (not shown) may include a microphone, joystick, game pad, satellite dish, scanner or the like. The interfaces can correspond to user interfaces 114 and 124 as described above.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include Other peripheral output devices (not shown), such as speakers and printers.

The computer 20 may operate in a networked environment using logical connections to one or more remote computers 49. The remote computer (or computers) 49 may be another computer, a server, a router, a network PC, a peer device, physical equipment 30 and/or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated in one aspect that when computer 20 corresponds to client device 110, remote computer 49 can correspond to remote server 120 and the network can correspond to network 130.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet. Moreover, the modem 54, which may be internal or external, is connected to the system bus 23 via the serial port interface 46, In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any Other medium that can be used to carry or store desired program code in the form of instructions or data structures and that can be accessed by a processor Of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for sharing data stored on a computing device by a mobile client device, the method comprising:
    establishing a list comprising a plurality of data sharing services where each data sharing service of the plurality of data sharing services is configured to communicate data between a mobile client communication module installed on the mobile client device and an agent communication module installed upon the computing device;
    establishing a connection between the mobile client communication module and the agent communication module;
    establishing selection of an electronic file;
    establishing selection of a data sharing service of the plurality of data sharing services;
    transferring the selected electronic file with the selected data sharing service of the plurality of data sharing services;
    establishing the agent communication module upon the computing device querying with the mobile client communication module the operating system of the mobile client device to identify available other data sharing services of the mobile device; and
    registering the agent communication module as either a share extension when an operating system of the computing device is of a first type or as a shell extension of a file management software application when the operating system of the computing device is of a second type;
    receiving the selected electronic file upon the mobile client device;
    establishing selection of an other data sharing service of the available other data sharing services of the mobile device; and
    transferring the selected electronic file with the other selected data sharing service of the plurality of other data sharing services to an electronic device from the mobile client device.

2. The method according to claim 1, wherein establishing selection of the electronic file comprises selecting the electronic file within a list of electronic files within a graphical user interface;
    establishing selection of the data sharing service of the plurality of data sharing services comprises selecting the data sharing service of the plurality of data sharing services from a list of menu items added to a standard context menu rendered within the graphical user interface in dependence upon an action performed by a user one the selected electronic file has been selected;
    each menu item of the list of items is associated with a data sharing service of the plurality of data sharing services;
    establishing selection of the other data sharing service of the plurality of other data sharing services comprises selecting the other data sharing service of the plurality of other data sharing services from a list of other menu items added to a standard context menu rendered within another graphical user interface upon the mobile client device in dependence upon an other action performed by the user;
    each other menu item of the list of other items is associated with an other data sharing service of the plurality of other data sharing services.

3. A method for sharing data stored on a computing device by a mobile client device, the method comprising:
    establishing a list comprising a plurality of data sharing services where each data sharing service of the plurality of data sharing services is configured to communicate data between a mobile client communication module installed on the mobile client device and an agent communication module installed upon the computing device;
    establishing selection of a data sharing service of the plurality of data sharing services;
    establishing a connection between the mobile client communication module and the agent communication module;
    establishing selection of an electronic file;
    determining whether to establish the mobile client device in a first operational mode or a second operational mode in dependence upon a physical position of the mobile client device with respect to the computing device; and
    transferring the selected electronic file with the selected data sharing service of the plurality of data sharing services; wherein
    in the first operational mode the mobile client device communicates directly with the computing device; and
    in the second operational mode the mobile client device communicates to the computing device via a network to which the mobile client device and computing device are both connected.

4. A method for sharing data stored on a computing device by a mobile client device, the method comprising:
    establishing a list comprising a plurality of data sharing services where each data sharing service of the plurality of data sharing services is configured to communicate data between a mobile client communication module installed on the mobile client device and an agent communication module installed upon the computing device;

establishing a connection between the mobile client communication module and the agent communication module;
establishing selection of an electronic file;
establishing selection of a data sharing service of the plurality of data sharing services;
transferring the selected electronic file with the selected data sharing service of the plurality of data sharing services;
establishing the agent communication module upon the computing device;
establishing a data sharing module upon the mobile client device;
registering the agent communication module as either a share extension when an operating system of the computing device is of a first type or as a shell extension of a file management software application when the operating system of the computing device is of a second type;
receiving the selected electronic file upon the mobile client device;
establishing selection of an other data sharing service of plurality of other data sharing services; and
transferring the selected electronic file with the an other selected data sharing service of the plurality of other data sharing services to an electronic device from the mobile client device.

5. The method according to claim 4, wherein establishing selection of the electronic file comprises selecting the electronic file within a list of electronic files within a graphical user interface;
establishing selection of the data sharing service of the plurality of data sharing services comprises selecting the data sharing service of the plurality of data sharing services from a list of menu items added to a standard context menu rendered within the graphical user interface in dependence upon an action performed by a user one the selected electronic file has been selected;
each menu item of the list of items is associated with a data sharing service of the plurality of data sharing services;
establishing selection of the other data sharing service of the plurality of other data sharing services comprises the data sharing module automatically establishing the selected other data sharing service of the plurality of other data sharing services independence upon data within the received selected electronic file.

6. A method for sharing data stored on a computing device by a mobile client device, the method comprising:
establishing a list comprising a plurality of data sharing services where each data sharing service of the plurality of data sharing services is configured to communicate data between a mobile client communication module installed on the mobile client device and an agent communication module installed upon the computing device;
establishing a connection between the mobile client communication module and the agent communication module;
establishing selection of an electronic file;
establishing selection of a data sharing service of the plurality of data sharing services; and
transferring the selected electronic file with the selected data sharing service of the plurality of data sharing services;
establishing the agent communication module upon the computing device querying with the mobile client communication module the operating system of the mobile client device to identify available other data sharing services of the mobile device;
determining whether to establish the mobile client device in a first operational mode or a second operational mode in dependence upon a physical position of the mobile client device with respect to the computing device;
determining whether to establish the mobile client device in a third operational mode or a fourth operational mode in dependence upon a physical position of the mobile client device with respect to an electronic device;
establishing a subset of the identified available other data sharing services of the mobile device as the list comprising a plurality of other data sharing services in dependence upon whether the mobile client device is in the first operation mode or the second operation mode;
establishing another subset of the identified available other data sharing services of the mobile device as another list comprising the plurality of other data sharing services in dependence upon whether the mobile client device is in the third operation mode or the fourth operation mode;
receiving the selected electronic file upon the mobile client device;
establishing selection of an other data sharing service of the plurality of other data sharing services of the mobile device; and
transferring the selected electronic file with the an other selected data sharing service of the plurality of other data sharing services to the electronic device from the mobile client device.

7. The method according to claim 6, wherein in the first operational mode the mobile client device communicates each directly with the computing device; and
in the second operational mode the mobile client device communicates to the computing device via a network to which the mobile client device and computing device are both connected;
in the third operational mode the mobile client device communicates each directly with the electronic device; and
in the fourth operational mode the mobile client device communicates to the electronic device via a network to which the mobile client device and electronic device are both connected.

* * * * *